(12) United States Patent
Becker et al.

(10) Patent No.: US 6,302,020 B1
(45) Date of Patent: Oct. 16, 2001

(54) METHOD AND DEVICE FOR ENGRAVING IMPRESSION CYCLINDERS

(75) Inventors: Karsten Becker, Rathjensdorf; Bernd Lübcke, Molfsee; Reinhold Bruno Bleihöfer-Sterzinger, Schönkirchen, all of (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 09/380,851

(22) PCT Filed: Feb. 17, 1998

(86) PCT No.: PCT/DE98/00460

§ 371 Date: Nov. 18, 1999

§ 102(e) Date: Nov. 18, 1999

(87) PCT Pub. No.: WO98/40211

PCT Pub. Date: Sep. 17, 1998

(30) Foreign Application Priority Data

Mar. 12, 1997 (DE) .............................................. 197 10 005

(51) Int. Cl.⁷ .................................................. B41C 1/045
(52) U.S. Cl. ........................................... 101/170; 358/299
(58) Field of Search ................................. 101/128.4, 150, 101/153, 170, 401.1, 467; 358/299

(56) References Cited

U.S. PATENT DOCUMENTS

| | | | |
|---|---|---|---|
| 3,975,761 | 8/1976 | Taudt et al. | 358/524 |
| 4,546,232 | 10/1985 | Beisswenger et al. | 219/121.19 |
| 4,605,957 | 8/1986 | Yamada | 358/537 |
| 5,186,102 | 2/1993 | Kanno et al. | 101/128.4 |
| 5,416,597 * | 5/1995 | Mubaslat | 358/299 |
| 5,503,876 * | 4/1996 | Fields et al. | 10/170 |
| 5,822,078 * | 10/1998 | Hirai et al. | 358/299 |
| 5,847,837 * | 12/1998 | Ogawa | 358/299 |
| 5,892,589 * | 4/1999 | Beckett et al. | 358/299 |
| 5,947,020 * | 9/1999 | Bornhorst, Jr. et al. | 358/299 |
| 6,025,921 * | 2/2000 | Beckett et al. | 358/299 |

FOREIGN PATENT DOCUMENTS

| | | |
|---|---|---|
| 25 13 042 | 3/1980 | (DE) . |
| 40 17 164 | 12/1991 | (DE) . |
| 0 108 376 | 5/1984 | (EP) . |
| 0 207 246 | 1/1987 | (EP) . |
| 1 407 487 | 9/1975 | (GB) . |
| 2 100 092 | 12/1982 | (GB) . |
| WO 94/19900 | 9/1994 | (WO) . |

\* cited by examiner

*Primary Examiner*—Stephen R. Funk
(74) *Attorney, Agent, or Firm*—Schiff Hardin & Waite

(57) ABSTRACT

In a device for engraving screen-based impression cylinders, particularly for intaglio printing, by means of an engraving element in an electronic engraving machine, an engraving element is controlled by an engraving signal which engraves a series of wells into the rotating impression cylinder line by line. The wells are arranged according to a screen defined by presettable engraving parameters, and their engraving depths represent the engraved tone values. To engrave the entire surface area of the wells, the engraving element moves in a feed motion along the impression cylinder in the direction of the axis of the impression cylinder. The screen geometry is determined by the peripheral speed of the rotating impression cylinder and the feed motion of the engraving element. By controlling the engraving machine using automatic process control, several sequential engravings with different engraving parameters, such as screen parameters, are carried out in one step on at least one impression cylinder with at least one engraving element. The sequential engravings are multiple engravings or re-engravings from first engravings.

17 Claims, 2 Drawing Sheets

METHOD AND DEVICE FOR ENGRAVING IMPRESSION CYCLINDERS

BACKGROUND OF THE INVENTION

The invention is in the field of electronic reproduction technology and is directed to a method for engraving rastered printing cylinders, particularly for rotor gravure, with an engraving element in an electronic engraving machine.

When engraving rastered printing cylinders in an electronic engraving machine, an engraving element that, for example, comprises an engraving stylus as a cutting tool moves along a rotating printing cylinder in the axial direction continuously or step-by-step. The engraving stylus controlled by an engraving signal cuts a sequence of depressions arranged in a raster, referred to below as cups, into the generated surface of the printing cylinder. The engraving signal is formed from the superimposition of an image signal representing the hues between "black" and "white" with a periodic raster signal. Together with the circumferential speed of the printing cylinder and the axial feed speed of the engraving element, the raster signal defines the geometry of the engraved raster. Whereas the periodic raster signal effects a vibrating lifting motion of the engraving stylus, the image signal—corresponding to the hues to be reproduced—controls the depths of the cups engraved into the generated surface of the printing cylinder.

Such an engraving machine for engraving printing cylinders is disclosed, for example, by WO-A-94/19900. This is a matter of a method for calibrating an engraving signal, whereby cups are engraved, the geometric actual dimensions of the engraved cups are measured, and whereby setting values are determined from the comparison of the measured actual value dimensions to predetermined rated dimensions, the engraving signal values for selected gradations being corrected with the setting values such that the actual gradations in fact engraved in the form of cups correspond to the rated gradations defined by the image signal values.

GB-A-1407487 discloses another engraving machine for engraving printing cylinders. This is a matter of a method for engraving a printing page composed of a plurality of image and text parts compiled according to a layout plan, whereby the engraving data required for engraving the printing page are compiled from the engraving data of the individual image and text parts according to the layout plan to form overall engraving lines before the engraving and are stored, and whereby the compiled engraving data of the overall engraving lines are read out in the engraving and supplied to the engraving element.

In manufacturing printing forms, particularly for packaging printing, sequential, i.e. successively sequencing engravings' must often be produced with the same or with different engraving parameters such as, for example, the raster parameters of screen angle and raster width. Examples of sequential engraving are the re-engraving of areas within an initial engraving or multiple engravings (copies) of half-tone images and line information or, respectively, bar codes in the axial direction. The sequential engravings can occur on a printing cylinder or on a plurality of printing cylinders having the same or different diameters.

Due to the function modes of traditional engraving machines, such sequential engravings with different engraving parameters on one printing cylinder or on a plurality of printing cylinders with, potentially, different diameters' cannot he automatically implemented in one pass, for example without intervention of an operator in a night shift, which is disadvantageous.

SUMMARY OF THE INVENTION

It is therefore an object of the present invention to improve a method for engraving rastered printing cylinders, particularly for rotor gravure, with an engraving element in an electronic engraving machine such that engravings with identical or different engraving parameters can be automatically implemented in one pass on at least one printing cylinder.

According to the method of the present invention for engraving a rastered printing cylinder for rotogravure with an engraving element in an electronic engraving machine, an engraving signal is acquired for driving an engraving element dependent on predetermined engraving parameters. With the engraving element, cups are engraved into a rotating printing cylinder arranged in a raster defined by predetermined engraving parameters, engraving depths of the cups representing engraved gradations. With the engraving element, for planar engraving of the cups, implementing the feed motion along the printing cylinder preceding axially relative to the printing cylinder, a geometry of the raster being determined, among other things, by a circumferential speed of the rotating printing cylinder and by a feed motion of the engraving element. At least one of circumferential speed and feed rate are set dependent on the predetermined engraving parameters. Engravings of individual engraving jobs sequencing in chronological succession or engraving areas of the printing cylinder with at least one engraving element are automatically implemented in one pass by an automatic executive sequencer programmable according to the individual engraving jobs. Dependent on respectively prescribed engraving parameters of the individual engraving jobs, control signals are generated in the executive sequencer, the control signals according to a position of the individual engraving areas on the printing cylinder automatically changing at least axial position and feed rate of the engraving element as well as the circumferential speed of the printing cylinder for following engraving job after the end of an engraving job.

BRIEF DESCRIPTION OF THE DRAWINGS

The invention is explained in greater detail below with reference to FIGS. 1 through 5.

DESCRIPTION OF THE PREFERRED EMBODIMENTS

Figure 1:
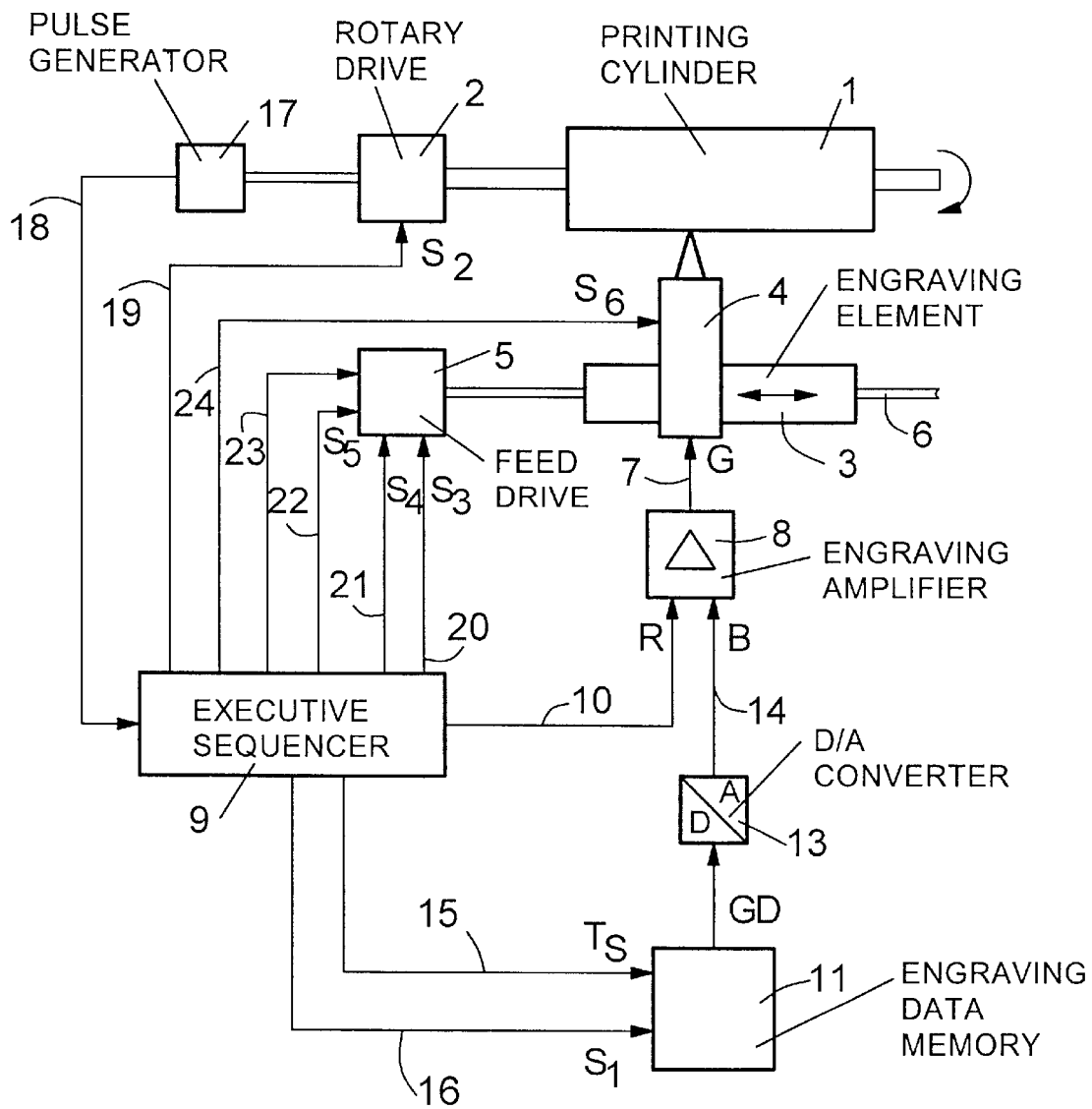
FIG. 1 is a schematic block circuit diagram of an engraving machine for printing cylinders.

FIG. 1 shows a schematic block circuit diagram of an engraving machine for engraving printing cylinders.

A printing cylinder 1 is rotationally driven by a rotatory drive 2. An engraving element 4 mounted on an engraving carriage 3 moves past the rotating printing cylinder 1 in axial direction with the assistance of a spindle 6 driven by a feed drive 5.

The engraving element 4 in the exemplary embodiment is an electromagnetic engraving element and essentially comprises an engraving stylus moved by an electromagnetic drive system as a cutting tool, a sliding foot and a scraper.

The engraving stylus of the engraving element 4 controlled by an engraving signal (G) on a line 7 cuts a sequence of cups arranged in a raster into the generated surface of the rotating printing cylinder 1 engraving line by engraving line, while the engraving element 4 moves axially along the printing cylinder 1 step-by-step. The sliding foot, which is supported on the generated surface of the rotating printing cylinder 1 during the engraving, provides a constant distance between the engraving stylus in its quiescent position and the generated surface. The scraper sliding on the generated surface removes the material formed when cutting the cups.

In the illustrated exemplary embodiment, the engraving of the printing cylinder 1 occurs on a single engraving line proceeding circularly around the printing cylinder 1, whereby the engraving element 4 implements an axial feed step to the next engraving line after the respective engraving of an engraving line. Such an engraving method is disclosed, for example, in U.S. Pat. No. 4,013,829 A. Alternatively, the engraving of the printing cylinder 1, however, can also occur in an engraving line proceeding helically around the printing cylinder 1, whereby the engraving element 4 then implements a continuous feed motion.

The engraving signal (G) on the line 7 is formed in an engraving amplifier 8 from the superimposition of a periodic raster signal (R), also referred to as a vibration, with analog image values (B) that represent the hues between "black" and "white" of the cups to be engraved. Whereas the periodic raster signal (R) effects a vibrating lifting motion of the engraving stylus for generating the raster, the analog image values B, corresponding to the hues to be engraved, determine the penetration depths of the engraving stylus into the generated surface of the printing cylinder 1.

The frequency of the raster signal (R) together with the circumferential speed of the printing cylinder 1 and the axial feed step width of the engraving element 4 determine the geometry of the raster to be engraved with respect to screen angle and raster width.

The raster signal (R) is generated in an executive sequencer 9 and is supplied to the engraving amplifier 8 via a line 10.

The engraving data (GD) are deposited in an engraving data memory 11 engraving line by engraving line in the sequence required for the engraving of the printing cylinder 1, being deposited in the form of data files for the job of an engraving order to be processed. An engraving datum of at least one byte is allocated to each cup to be engraved, this containing, among other things, the hue between "black" and "white" to be engraved as engraving information.

The engraving data (GD) are, for example, acquired in a scanner by point-by-point and line-by-line, optoelectronic scanning of a master to be reproduced and are then deposited in the engraving data memory 11.

When engraving the printing cylinder 1, the engraving data (GD) are read from the engraving data memory 11 with a read clock sequence $T_s$ and are converted into the analog image values B in an D/A converter 13, these then being supplied to the engraving amplifier 8 via a line 14.

The read clock sequence $T_s$, whose frequency corresponds to the single or multiple frequency of the raster signal (R), is likewise generated in the executive sequencer 9 and proceeds via a line 15 to the engraving data memory 11. The executive sequencer 9 also generates a control instruction $S_1$ "enable engraving" that is supplied to the engraving data memory 11 via a line 16 and respectively enables the engraving of the cups on the individual engraving lines.

The executive sequencer 9 is synchronized with the rotational motion of the printing cylinder 1 in that a pulse generator 17 mechanically coupled to the rotational drive 2 supplies a synchronizing signal to the executive sequencer 9 via the line 18.

For the implementation of the automatic sequential engraving of the invention with identical or different engraving parameters, various control commands are generated in the executive sequencer 9 according to a programmable sequence plan for the jobs to be processed in a current engraving order. The engraving parameters can, for example, be the raster parameters, the scale or the gradation. The individual job data, including the engraving parameters, for the individual jobs of a current engraving order are input into the executive sequencer 9.

The rotational drive 2 comprises a variable speed drive motor. After the printing cylinder 1 having a great mass has been introduced into the engraving machine, the speed of the drive motor is continuously increased from standstill until the printing cylinder 1 has reached its respective working speed. The circumferential speed of the printing cylinder 1 can be varied in conformity with the rasters to be engraved at the rotating printing cylinder 1 via a change in speed with a control instruction $S_2$ "change speed" on a line 19 to the rotational drive 2.

The feed drive 5 is designed as a positioning drive with a stepping motor. The frequency of a pulse clock sequence supplied to the stepping motor determines the speed of the stepping motor and, thus, the feed speed of the engraving element 4.

Since every clock of the pulse clock sequence corresponds to a traversed distance increment of the engraving element 4, the respective axial position of the engraving element 4 can be identified by counting the clocks.

By comparing a predetermined plurality of clocks of the pulse clock sequence that corresponds to an axial rated position of the engraving element 4 to the number of clocks of the pulse clock sequence supplied to the stepping motor according to the respective, axial actual position of the engraving system 4, an exact axial positioning of the engraving element 4 can be undertaken. An exact axial positioning of the engraving element 4 is required when approaching the starting position and upon implementation of the step-by-step feed motion from engraving line to engraving line during the engraving.

Various commands are forwarded from the executive sequencer 9 to the feed control 5 for controlling the feed motion of the engraving element 4. A control command $S_3$ "start/stop" on a line 20 controls the feed motion of the engraving element 4 when approaching the axial starting positions before the engraving and controls the step-by-step feed motion during engraving. A further control command $S_4$ "feed direction" on a line 21 defines the feed direction of the engraving element 4 when approaching the starting positions. Another control command $S_5$ "feed step" on a line 22 determines the respective feed step width in conformity with the raster to be engraved or, respectively, determines the spacing between the engraving lines. Via a line 23, the axial starting position (SP), the axial ending position (EP) as well as the adjusted position of the engraving element 4 when engraving the individual jobs are communicated to the feed control 5.

The engraving element 4 comprises an electrically controllable lift-off unit (not shown) that lowers the active part of the engraving element 4 with the engraving stylus, sliding foot and scraper into a working position on the generated surface of the rotating printing cylinder 1 for the implementation of an engraving and, given interruptions in engraving and positionings of the engraving element 4, lifts it off from the generated surface of the printing cylinder 1 into a quiescent position. A further adjustment unit (not shown) controls the radial adjustment of the engraving element 4 dependent on the respective diameter of the printing cylinder 1.

A further control signal $S_6$ "lift-off" and "adjust" on a line 24 from the executive sequencer 9 to the lift-off unit and the adjustment unit of the engraving element 4 controls the radial adjustment of the engraving element 4 and the lifting and lowering of the active part of the engraving element 4.

A few examples of automatically running sequential engravings are explained below with reference to FIGS. 2 through 4.

Figure 2:
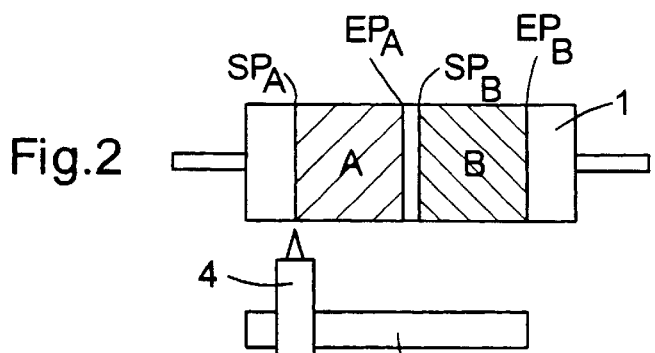
FIG. 2 is a first example of a sequential engraving on a printing cylinder.

FIG. 2 shows a first example of a sequential engraving of two jobs on a printing cylinder 1.

Two engravings (copies) "A" and "B" lying next to one another in the direction are to be automatically engraved in one pass on the printing cylinder 1 with a single engraving element 4. The engravings "A" and "B" should exhibit different rasters with respect to screen angle and raster width. Let the engraving "A", for example, be bar codes and the engraving "B" be a half-tone image, whereby the bar codes are to be engraved in an essentially finer raster than the half-tone image.

In this case, the bar code data file of the job "A" and the image data file of the job "B" are deposited in the engraving data memory 11 in FIG. 1. The different raster parameters, the start positions "$SP_A$; $SP_B$" and the ending positions ($EP_A$; $EP_B$) of the two jobs are input into the executive sequencer 9.

In the executive sequencer 9, the required circumferential speed of the printing cylinder 1 and the feed steps of the engraving element 4 that must be set for engraving the different rasters in the two jobs are determined taking the respective cylinder diameter into consideration.

The sequential engraving according to the first exemplary embodiment then runs automatically in the following steps:

1. Setting the circumferential speed of the printing cylinder 1 according to the raster to be engraved for the engraving "A".
2. Setting the feed step of the engraving element 4 according to the raster to be engraved for the engraving "A".
3. Positioning the engraving element 4 to the starting position ($SP_A$) of the engraving "A" from an axial initial position.
4. Lowering the engraving element 4 into the working position.
5. Implementing the engraving "A" up to the ending position ($EP_A$).
6. Lifting the engraving element 4 into the quiescent position after the ending position ($EP_A$ has been reached.
7. Modifying the circumferential speed of the printing cylinder 1 according to the raster to be engraved for the engraving "B".
8. Modifying the feed step of the engraving element 4 according to the raster to be engraved for the engraving "B".
9. Positioning the engraving element 4 to the starting position ($SP_B$) of the engraving "B" proceeding from the ending position ($EP_A$).
10. Lowering the engraving element 4 into the working position.
11. Implementing the engraving "B" up to the ending position ($EP_B$)
12. Lifting the engraving element 4 into the quiescent position after reaching the ending position ($EP_B$).
13. Positioning the engraving system 4 into the axial initial position.

Figure 3:
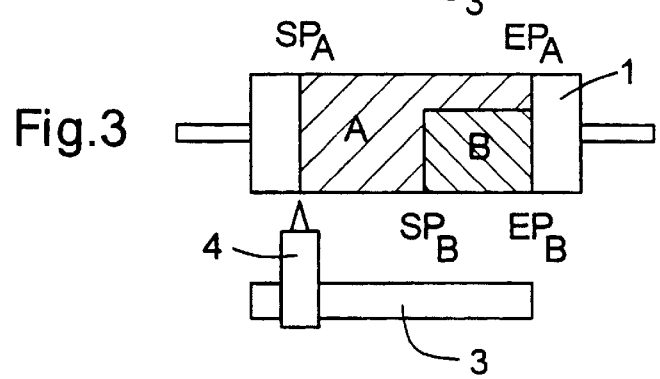
FIG. 3 is a second example of a sequential engraving on a printing cylinder.

FIG. 3 shows a second example of a sequential engraving of two jobs on a printing cylinder 1.

First, an initial engraving "A" and then a successor engraving "B" in a region omitted in the initial engraving "A" are to be automatically engraved on the printing cylinder 1 in one pass with a single engraving element 4. Initial engraving "A" and subsequent engraving "B" should have different rasters with respect to screen angle and raster width. The engraving lines required for the initial and subsequent engraving are built up from the two jobs (A; B), for example by superimposing the engraving data (GD). Alternatively, the starting positions of the subsequent engraving "B" can also be calculated in feed and circumferential direction, whereby only the engraving data (GD) of the job "B" are read out by engraving lines in the subsequent engraving "B".

The sequential engraving according to the second example then automatically runs in the following steps:

1. Setting the circumferential speed of the printing cylinder 1 according to the raster to be engraved for the initial engraving "A".
2. Setting the feed step of the engraving element 4 according to the raster to be engraved for the initial engraving "A".
3. Positioning the engraving element 4 onto the starting position $SP_A$ of the initial engraving "A" from the axial initial position.
4. Lowering the engraving element 4 into the working position.
5. Implementing the initial engraving "A" up to the ending position $EP_A$ leaving out the region for the subsequent engraving "B" by not engraving in this region.
6. Lifting the engraving element 4 into the quiescent position after the ending position ($EP_A$) has been reached.
7. Returning the engraving element 4 and positioning to the starting position ($SP_B$) of the subsequent engraving "B".
8. Modifying the circumferential speed of the printing cylinder 1 according to the raster to be engraved for the subsequent engraving "B".
9. Modifying the feed step of the engraving element 4 according to the raster to be engraved for the subsequent engraving "B".
10. Lowering the engraving element 4 into the working position.
11. Implementing the subsequent engraving "B" up to the ending position ($EP_B$) of the subsequent engraving "B".
12. Lifting the engraving element 4 into the quiescent position in the ending position ($EP_B$) of the subsequent engraving "B".
13. Positioning the engraving system 4 in the axial initial position.

Figure 4:
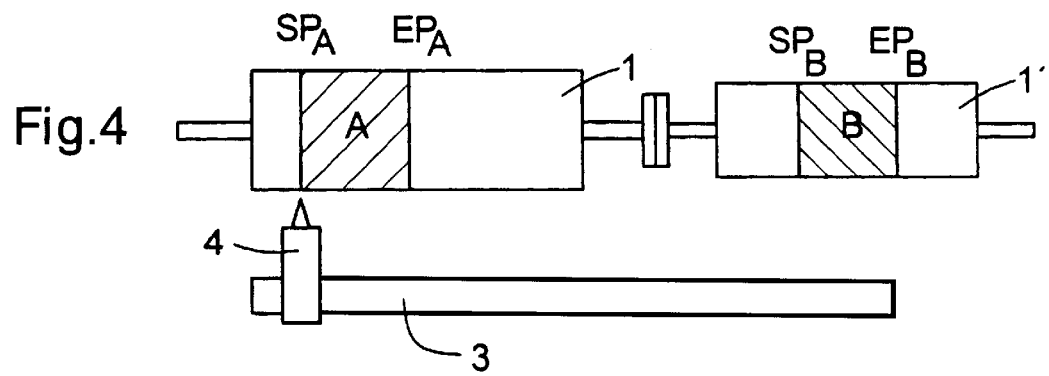
FIG. 4 shows a third example of a sequential engraving on two printing cylinders.

FIG. 4 shows a third example of a sequential engraving of two jobs on two printing cylinders (1; 1') mechanically coupled to one another that are assumed to have different diameters (twin operation).

An engraving "A" on the first printing cylinder 1 and an engraving "B" on the second printing cylinder 1'are to be automatically engraved in one pass with a single engraving element 4. Engraving "A" and engraving "B" in turn have different rasters.

The sequential engraving according to the third example then automatically runs in the following steps:

1. Setting the circumferential speed of the first printing cylinder 1 according to the raster to be engraved for the engraving "A" on the first printing cylinder 1, taking its diameter into consideration.
2. Setting the feed step of the engraving element 4 according to the raster to be engraved for the engraving "A" on the first printing cylinder 1.
3. Positioning the engraving element 4 to the starting position ($SP_A$) of the engraving "A" from the axial initial position and radial setting of the engraving element 4 according to the diameter of the first printing cylinder 1.
4. Lowering the engraving element 4 into the working position.
5. Implementation of the engraving "A" up to the ending position ($EP_A$ with the engraving element 4 on the first printing cylinder 1.
6. Lifting the engraving element 4 into the quiescent position after the ending position ($EP_A$ of the engraving "A" has been reached.
7. Modifying the circumferential speed of the second printing cylinder 1' according to the raster to be engraved for the engraving "B" on the second printing cylinder 1', taking its diameter into consideration.
8. Modifying the feed step of the engraving element 4 according to the raster to be engraved for the engraving "B" on the second printing cylinder 1'.
9. Positioning the engraving element 4 to the starting position ($SP_B$) of the engraving "B" on the second printing cylinder 1' and radial setting of the engraving element 4 corresponding to the diameter of the second printing cylinder 1'.
10. Lowering the engraving element 4 into the working position.
11. Implementation of the engraving "B" up to the ending position ($EP_B$) of the engraving "B" on the second printing cylinder 1'.
12. Lifting the engraving element 4 into the quiescent position in the ending position ($EP_B$) of the engraving "B".
13. Positioning the engraving element 4 in the axial initial position.

Figure 5:
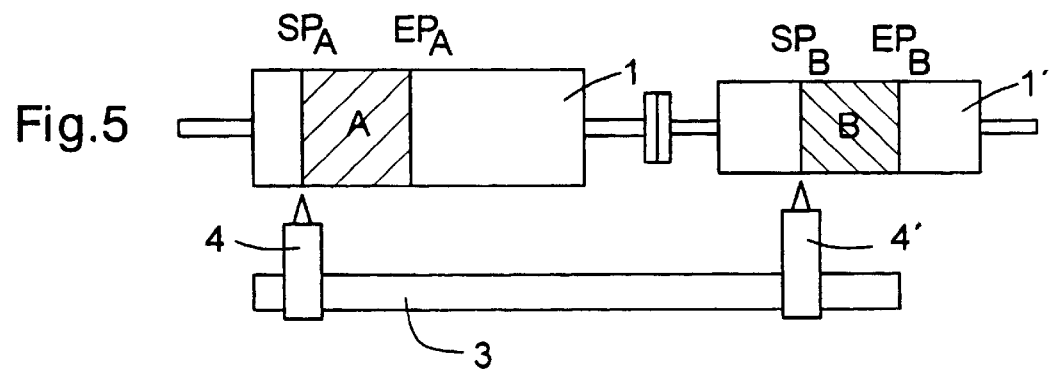
FIG. 5 illustrates a fourth example for a sequential engraving on two printing cylinders.

FIG. 5 shows a fourth example of a sequential engraving of two jobs on two printing cylinders 1, 1' mechanically coupled to one another that are again assumed to have different diameters (twin operation).

An engraving "A" on the first printing cylinder 1 and an engraving "B" on the second printing cylinder 1'are to be automatically engraved in one pass with a respective engraving element (4; 4') that are mounted in common on the engraving carriage.

The sequential engraving according to the fourth example then runs automatically in the following steps:

1. Setting the circumferential speed of the first printing cylinder 1 according to the raster to be engraved for the engraving "A" on the first printing cylinder 1, taking the diameter thereof into consideration.
2. Setting the feed step of the first engraving element 4 according to the raster to be engraved for the engraving "A" on the first printing cylinder 1
3. Positioning the first engraving element 4 to the starting position ($SP_A$) of the engraving "A" from the axial initial position.
4. Lowering the first engraving element 4 into the working position.
5. Implementing the engraving "A" up to the ending position ($EP_A$ with the first engraving element 4 on the first printing cylinder 1.
6. Lifting the first engraving element 4 into the quiescent position after reaching the end position ($EP_A$) of the engraving "A".
7. Modifying the circumferential speed of the second printing cylinder 1' according to the raster to be engraved for the engraving "B" on the second printing cylinder 1', taking the diameter thereof into consideration.
8. Setting the feed step of the second engraving element 4' according to the raster to be engraved for the engraving "B" on the second printing cylinder 1'.
7. Positioning the second engraving element 4' to the start position ($SP_B$) of the engraving "B" by return of the engraving carriage 3.
10. Lowering the second engraving element 4 into the working position.
11. Implementing the engraving "B" up to the ending position ($EP_B$) of the engraving "B" on the second printing cylinder 1'.
12. Lifting the second engraving element 4' into the quiescent position in the ending position ($EP_B$) of the engraving "B".
13. Positioning the engraving systems 4; 4' in the axial initial position.

In the third and fourth examples of a sequential engraving, the two printing cylinders 1; 1' mechanically coupled to one another can, of course, also exhibit the same diameters, and the engravings can be implemented with the same engraving parameters.

Although various minor changes and qualifications might be proposed by those skilled in the art, it will be understood that our wish is to include within the claims of the patent warranted hereon all such changes and modifications as reasonably come within our contribution to the art.

What is claimed is:

1. A method for engraving at least one rotating printing cylinder for rotogravure with an engraving element in an electronic engraving machine, comprising the steps of:

acquiring an engraving signal for driving the engraving element dependent on predetermined engraving parameters;

with the engraving element, engraving cups into the at least one rotating printing cylinder arranged in a raster deformed by the predetermined engraving parameters, engraving depths of the cups representing engraved gradations;

with the engraving element for engraving of the cups implementing a feed motion along the printing cylinder proceeding axially relative to the printing cylinder, a geometry of the raster being determined at least in part by a circumferential speed of the rotating printing cylinder and by a feed motion of the engraving element;

setting at least one of circumferential speed and feed rate of the feed motion dependent on the predetermined engraving parameters;

automatically implementing engravings of individual engraving jobs sequencing in chronological succession on engraving areas of the at least one printing cylinder with at least one engraving element in one pass by an automatic executive sequencer programmable according to the individual engraving jobs;

dependent on respectively prescribed predetermined engraving parameters of the individual engraving jobs, generating control signals in the executive sequencer, said control signals, according to a position of the individual engraving areas on the printing cylinder automatically changing at least axial position and feed rate of the engraving element as well as the circumferential speed of the printing cylinder for a following subsequent engraving job after an end of an initial engraving job.

2. The method according to claim 1 wherein the control signals are additionally generated dependent on a diameter of the printing cylinder respectively employed.

3. The method according to claim 1 wherein additional control signals are generated in the executive sequencer which controls a radial adjustment of the engraving element relative to the printing cylinder, application of the engraving element against the printing cylinder at a start of engraving, and lift-off of the engraving element at an end of the engraving of each and every engraving job.

4. The method according to claim 1 wherein the engraving areas are engraved with different rasters.

5. The method according to claim 1 wherein line work are engraved in the engraving areas.

6. The method according to claim 1 wherein half-tone images are engraved in the engraving areas.

7. The method according to claim 1 wherein the engraving areas are engraved on a plurality of the printing cylinders having same diameters in one pass with a respective engraving element allocated to the corresponding printing cylinder.

8. The method according to claim 7 wherein the engraving elements are mounted on an axial displaceable engraving carriage.

9. The method according to claim 1 wherein the engraving areas area engraved on a plurality of the printing cylinders having different diameters in one pass with a respective engraving element allocated to the corresponding printing cylinder.

10. The method according to claim 9 wherein the engraving element is mounted on an axially displaceable engraving carriage.

11. The method according to claim 1 wherein the engraving areas are engraved side-by-side in the axial direction.

12. A method for engraving at least one rotating printing cylinder for rotogravure with an engraving element in an electronic engraving machine, comprising the steps of:

acquiring an engraving signal for driving the engraving element dependent on predetermined engraving parameters;

with the engraving element, engraving cups into the at least one rotating printing cylinder arranged in a raster defined by the predetermined engraving parameters, engraving depths of the cups representing engraved gradations;

with the engraving element for engraving of the cups implementing a feed motion along the printing cylinder proceeding axially relative to the printing cylinder, a geometry of the raster being determined at least in part by a circumferential speed of the rotating printing cylinder and by a feed motion of the engraving element;

setting at least one of circumferential speed and feed rate of the feed motion dependent on the predetermined engraving parameters;

automatically implementing engravings of individual engraving jobs sequencing in chronological succession on engraving areas of the at least one printing cylinder with at least one engraving element in one pass by an automatic executive sequencer programmable according to the individual engraving jobs;

dependent on respectively prescribed predetermined engraving parameters of the individual engraving jobs, generating control signals in the executive sequencer, said control signals, according to a position of the individual engraving areas on the printing cylinder automatically changing at least axial position and feed rate of the engraving element as well as the circumferential speed of the printing cylinder for a following subsequent engraving job after an end of an initial engraving job; and the engraving areas are engraved on a single printing cylinder only with an engraving element in one pass.

13. A method for engraving at least one rotating printing cylinder for rotogravure with an engraving element in an electronic engraving machine, comprising the steps of:

acquiring an engraving signal for driving the engraving element dependent on predetermined engraving parameters;

with the engraving element, engraving cups into the at least one rotating printing cylinder arranged in a raster deformed by the predetermined engraving parameters, engraving depths of the cups representing engraved gradations;

with the engraving element for engraving of the cups implementing a feed motion along the printing cylinder proceeding axially relative to the printing cylinder, a geometry of the raster being determined at least in part by a circumferential speed of the rotating printing cylinder and by a feed motion of the engraving element;

setting at least one of circumferential speed and feed rate of the feed motion dependent on the predetermined engraving parameters;

automatically implementing engravings of individual engraving jobs sequencing in chronological succession on engraving areas of the at least one printing cylinder with at least one engraving element in one pass by an automatic executive sequencer programmable according to the individual engraving jobs;

dependent on respectively prescribed predetermined engraving parameters of the individual engraving jobs, generating control signals in the executive sequencer, said control signals, according to a position of the individual engraving areas on the printing cylinder automatically changing at least axial position and feed rate of the engraving element as well as the circumferential speed of the printing cylinder for a following subsequent engraving job after an end of an initial engraving job; and the engraving areas are engraved on a plurality of the printing cylinders with a same diameter with a single engraving element in one pass.

14. The method according to claim 13 wherein the printing cylinders are mechanically coupled to one another and are rotationally driven in common.

15. A method for engraving at least one rotating printing cylinder for rotogravure with an engraving element in an electronic engraving machine, comprising the steps of:

acquiring an engraving signal for driving the engraving element dependent on predetermined engraving parameters;

with the engraving element, engraving cups into the at least one rotating printing cylinder arranged in a raster defined by the predetermined engraving parameters, engraving depths of the cups representing engraved gradations;

with the engraving element for engraving of the cups implementing a feed motion along the printing cylinder proceeding axially relative to the printing cylinder, a geometry of the raster being determined at least in part by a circumferential speed of the rotating printing cylinder and by a feed motion of the engraving element;

setting at least one of circumferential speed and feed rate of the feed motion dependent on the predetermined engraving parameters;

automatically implementing engravings of individual engraving jobs sequencing in chronological succession on engraving areas of the at least one printing cylinder with at least one engraving element in one pass by an automatic executive sequencer programmable according to the individual engraving jobs;

dependent on respectively prescribed predetermined engraving parameters of the individual engraving jobs, generating control signals in the executive sequencer, said control signals, according to a position of the individual engraving areas on the printing cylinder automatically changing at least axial position and feed rate of the engraving element as well as the circumferential speed of the printing cylinder for a following subsequent engraving job after an end of an initial engraving job; and the engraving areas are engraved on a plurality of the printing cylinders with different diameters with a single engraving element in one pass.

16. The method according to claim 15 wherein the printing cylinders are mechanically coupled to one another and are rotationally driven in common.

17. A method for engraving at least one rotating printing cylinder for rotogravure with an engraving element, comprising the steps of:

acquiring an engraving signal for driving the engraving element dependent on predetermined engraving parameters;

with the engraving element, engraving cups into the at least one rotating printing cylinder arranged in a raster defined by the predetermined engraving parameters;

with the engraving element implementing a feed motion along the printing cylinder proceeding axially relative to the printing cylinder, a geometry of the raster being determined at least in part by a circumferential speed of the rotating printing cylinder and by a feed motion of the engraving element;

setting at least one of circumferential speed and feed rate of the feed motion dependent on the predetermined engraving parameters;

automatically implementing engravings of individual engraving jobs sequencing in succession on engraving areas of the printing cylinder with at least one engraving element by an automatic executive sequencer programmable according to the individual engraving jobs;

dependent on respectively prescribed predetermined engraving parameters of the individual engraving jobs, generating control signals in the executive sequencer, said control signals, according to a position of the individual engraving areas on the printing cylinder automatically changing at least axial position and feed rate of the engraving element as well as the circumferential speed of the printing cylinder for a following subsequent engraving job after an end of an initial engraving job.

* * * * *